Oct. 13, 1931.  J. S. KEEN  1,827,587
MAIN CRANK PIN COLLAR FOR LOCOMOTIVES
Filed Oct. 25, 1928
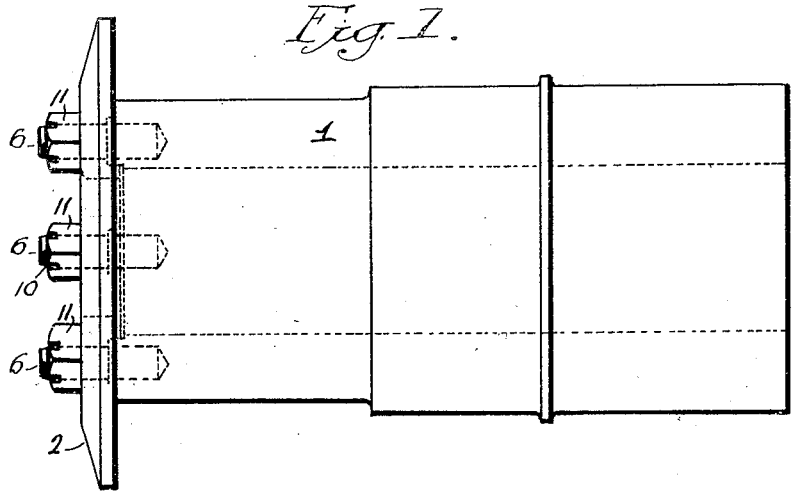
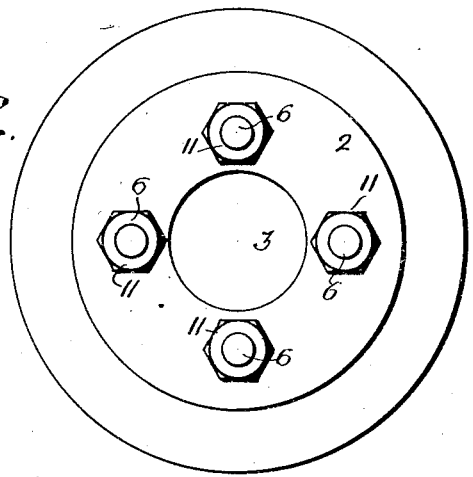
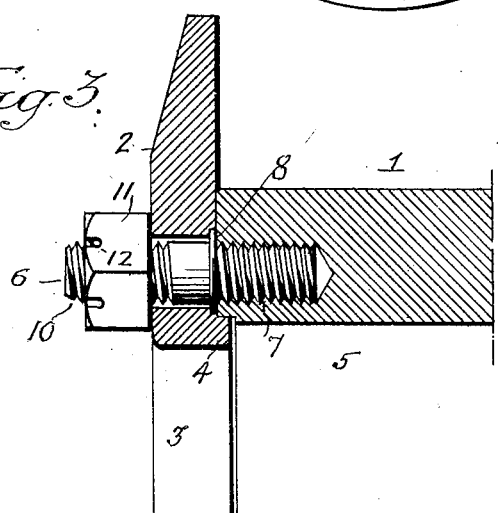
Inventor:
John S. Keen
by his Attorneys Patented Oct. 13, 1931

1,827,587

UNITED STATES PATENT OFFICE

JOHN S. KEEN, OF PHILADELPHIA, PENNSYLVANIA

MAIN CRANK PIN COLLAR FOR LOCOMOTIVES

Application filed October 25, 1928. Serial No. 315,092.

One object of my invention is to provide a detachable collar for the end of the main crank pin of a locomotive.

A further object of the invention is to provide means for securely fastening the collar to the end of the crank pin.

In the accompanying drawings:

Fig. 1 is a side view of a main crank pin of a locomotive illustrating my invention;

Fig. 2 is an end view; and

Fig. 3 is an enlarged sectional view of a portion of the pin.

Referring to the drawings, 1 is a main crank pin of a locomotive which is made hollow as shown for heat treatment, which also reduces the weight of the pin. On the end of the crank pin is secured a collar 2, shaped in the present instance as shown in Fig. 1, this collar being preferably made in the form of a ring open at the centre as at 3, Figs. 2 and 3. This reduces the weight of the collar without materially reducing its strength, as the additional weight of the crank pin must be balanced by the additional weight of the counter-balance, therefore the pin is made as light as possible without sacrificing strength.

The collar 2 has an inner flange 4 which projects into the opening 5 in the pin 1. In the present instance the opening is slightly enlarged, allowing the collar to accurately fit the enlarged portion. The collar is secured to the pin, in the present instance, by four stud bolts 6, which are threaded at 7. The threaded portions of the bolts are screwed into the threaded holes in the end of the pin as shown in Fig. 3. The bolts extend through perforations in the collar, and each bolt is preferably provided with a flange 8 which is located in a recess in the collar, the outer end of the bolt being threaded at 10, and mounted on this threaded end is a nut 11. Each nut 11 is castellated and held in place by a pin 12. As there are four bolts securing the collar to the end of the pin, if one nut should become loose the other nuts would hold the collar in place, the collar also retaining the stud bolt as the flange 8 on the stud bolt is held by the collar. It will be understood that the collar may be held on by two or three bolts, or more than four, if desired.

By this construction the collar can be readily detached when it is desired to remove the rod, as the bolts firmly secure the collar to the pin; and the collar can be made comparatively light without materially reducing its strength.

I claim:—

1. The combination of a hollow crank pin having a plurality of openings; a collar on the end of said pin, said collar having an open centre and perforated between the centre and periphery for stud bolts; a series of stud bolts screwed into the openings in the end of the pin and extending through the perforations in the collar; and nuts on said stud bolts retaining the collar on the pin.

2. The combination of a hollow crank pin having a plurality of openings; a collar on the end of said pin, said collar having an open centre and perforated between the centre and the periphery for stud bolts; a series of stud bolts screwed into the openings in the end of the pin and extending through the perforations in the collar; and nuts on said stud bolts retaining the collar on the pin, said collar having an annular inturned flange extending into the opening in the pin.

3. The combination of a hollow crank pin having a plurality of openings; a collar on the end of said pin, said collar having an open centre and perforated between the centre and the periphery for stud bolts; a series of stud bolts screwed into the openings in the end of the pin and extending through the perforations in the collar; nuts on said stud bolts retaining the collar on the pin, said collar having an annular inturned flange extending into the opening in the pin; and a flange on each stud bolt adapted to a recess in the collar so that the collar will prevent the stud bolts from turning on the pin.

4. The combination of a crank pin having a central opening therein and having a plurality of openings surrounding the central opening; a collar on the end of said pin, said collar having an inner flange extending into the central opening of the pin, and perforated between the center and its periphery for stud bolts; a series of stud bolts screwed into the openings surrounding the central opening in the end of the pin and extending through the perforations in the collar; and nuts on the stud bolts, retaining the collar on the pin.

JOHN S. KEEN.